(12) United States Patent
Huntzicker et al.

(10) Patent No.: US 10,124,724 B2
(45) Date of Patent: Nov. 13, 2018

(54) BABY IN VEHICLE REMINDER SYSTEM

(71) Applicant: GM Global Technology Operations LLC, Detroit, MI (US)

(72) Inventors: Fred W. Huntzicker, Ann Arbor, MI (US); William A. Biondo, Beverly Hills, MI (US); Julie A. Kleinert, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/886,700

(22) Filed: Oct. 19, 2015

(65) Prior Publication Data

US 2017/0106790 A1 Apr. 20, 2017

(51) Int. Cl.
| | | |
|---|---|---|
| *B60Q 5/00* | (2006.01) | |
| *B60Q 9/00* | (2006.01) | |
| *G07C 5/08* | (2006.01) | |
| *G08B 21/24* | (2006.01) | |

(52) U.S. Cl.
CPC ............ *B60Q 9/00* (2013.01); *G07C 5/08* (2013.01); *G08B 21/24* (2013.01); *G07C 5/0816* (2013.01)

(58) Field of Classification Search
CPC .... G08B 21/24; G08B 21/0202; G08B 21/22; G08B 21/02; G08B 25/14; B60R 2022/4816; B60R 22/48; B60R 2011/0063; B60R 2022/4866; B60R 22/00; B60R 11/04; B60R 1/00; B60R 2300/8013; B60R 25/30; H04M 1/72577; H04M 2250/10; H04M 2250/12; H04W 24/10; H04W 4/001; A62C 37/00; A62C 3/02; A62C 3/0214; A62C 3/0235; A62C 3/0292; G05D 1/0011; G05D 1/0088; G05D 1/0214; G05D 1/0276; G05D 1/0291; G05D 1/0055; G05D 1/0242; G05D 1/0255; G05D 2201/0206; G05D 9/12; G06F 3/04842; G06F 3/04847; G06F 3/1454; G06F 3/147; G06F 19/3468; G06F 19/3475; B60Q 9/00; B60Q 1/00; B60Q 5/005; A61B 5/7475; A61B 5/01; A61B 5/015; A61B 5/0205; A61B 5/02055; A61B 5/026; A61B 5/053; A61B 5/14532; A61B 5/14539; A61B 5/14542; A61B 5/14551; A61B 5/486; A61B 5/6828; A61B 5/6831; A61B 5/6833; A61B 5/6898; A61B 5/72; A61B 5/7221; A61B 5/7275; A61B 5/742; A61B 5/746; A61H 2003/043; A61H 2003/046; A61H 2201/0107; A61H 2201/0176; A61H 2201/1635; A61H 2201/5007; A61H 2201/5064; A61H 2201/5071; A61H 2201/5092; A61H 3/04; C21D 1/667; C21D 1/76; C21D 9/0056; C21D 9/0062; F27B 9/12; F27B 9/20; F27B 9/24; F27D 2009/0081; F27D 2009/0086; F27D 9/00; G07C 5/08; G07C 5/0816; A47J 31/20; A47J 31/52; A47J 31/56;

(Continued)

(56) References Cited

U.S. PATENT DOCUMENTS

| | | | | |
|---|---|---|---|---|
| 9,196,146 B1* | 11/2015 | Vicente | ................. | B60Q 5/005 |
| 9,439,479 B1* | 9/2016 | Vu | ..................... | A44B 11/2576 |
| 2003/0222775 A1* | 12/2003 | Rackham | ............ | B60R 25/1004 |
| | | | | 340/457 |

(Continued)

*Primary Examiner* — Daniel Previl
(74) *Attorney, Agent, or Firm* — BrooksGroup

(57) ABSTRACT

A number of illustrative variations may include a method of using sequential logic and vehicle sensors to produce a notification.

18 Claims, 3 Drawing Sheets

(58) Field of Classification Search
CPC ..... A61D 7/04; A61M 16/0078; A61M 16/01;
A61M 16/104; A61M 16/18; A61M
16/209; A61M 16/22; A61M 2016/103;
A61M 2016/1035; A61M 2205/3306;
A61M 2205/3317; A61M 2205/3368;
A61M 2205/3379; A61M 2205/3382;
A61M 2205/3386; A61M 2205/502;
A61M 2230/432; A61M 2250/00; B01D
11/02; B01D 11/023; B01D 11/028;
B01D 11/0288; B01D 1/14; B01D
2011/007; B01D 3/343; C11B 1/00;
G05B 6/02; G16H 10/60; G16H 50/30;
Y10T 137/7287
USPC ...... 340/438, 539.11, 439, 435, 436, 426.34,
340/457, 457.1, 457.2, 460, 463, 468,
340/568.1
See application file for complete search history.

(56) References Cited

U.S. PATENT DOCUMENTS

| | | | |
|---|---|---|---|
| 2013/0076502 A1* | 3/2013 | Kahng | B60Q 9/00 340/457 |
| 2013/0109342 A1* | 5/2013 | Welch | B60N 2/002 455/404.2 |
| 2013/0307684 A1* | 11/2013 | Pallotta | H04M 1/72577 340/539.11 |
| 2014/0125502 A1* | 5/2014 | Wittkop | G08G 1/127 340/989 |
| 2014/0274020 A1* | 9/2014 | Miller | H04W 4/046 455/418 |
| 2014/0277935 A1* | 9/2014 | Daman | G08G 1/127 701/36 |
| 2016/0104328 A1* | 4/2016 | Chen | G07C 5/0858 701/31.5 |

* cited by examiner

BABY IN VEHICLE REMINDER SYSTEM

TECHNICAL FIELD

The field to which the disclosure generally relates to includes vehicle reminder systems.

BACKGROUND

Some vehicles come paired with electronic FOBs which aid the vehicle in proximity sensing.

SUMMARY OF ILLUSTRATIVE VARIATIONS

A number of illustrative variations may include a method of using a controller and combinational or sequential logic and vehicle sensors to produce a notification.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
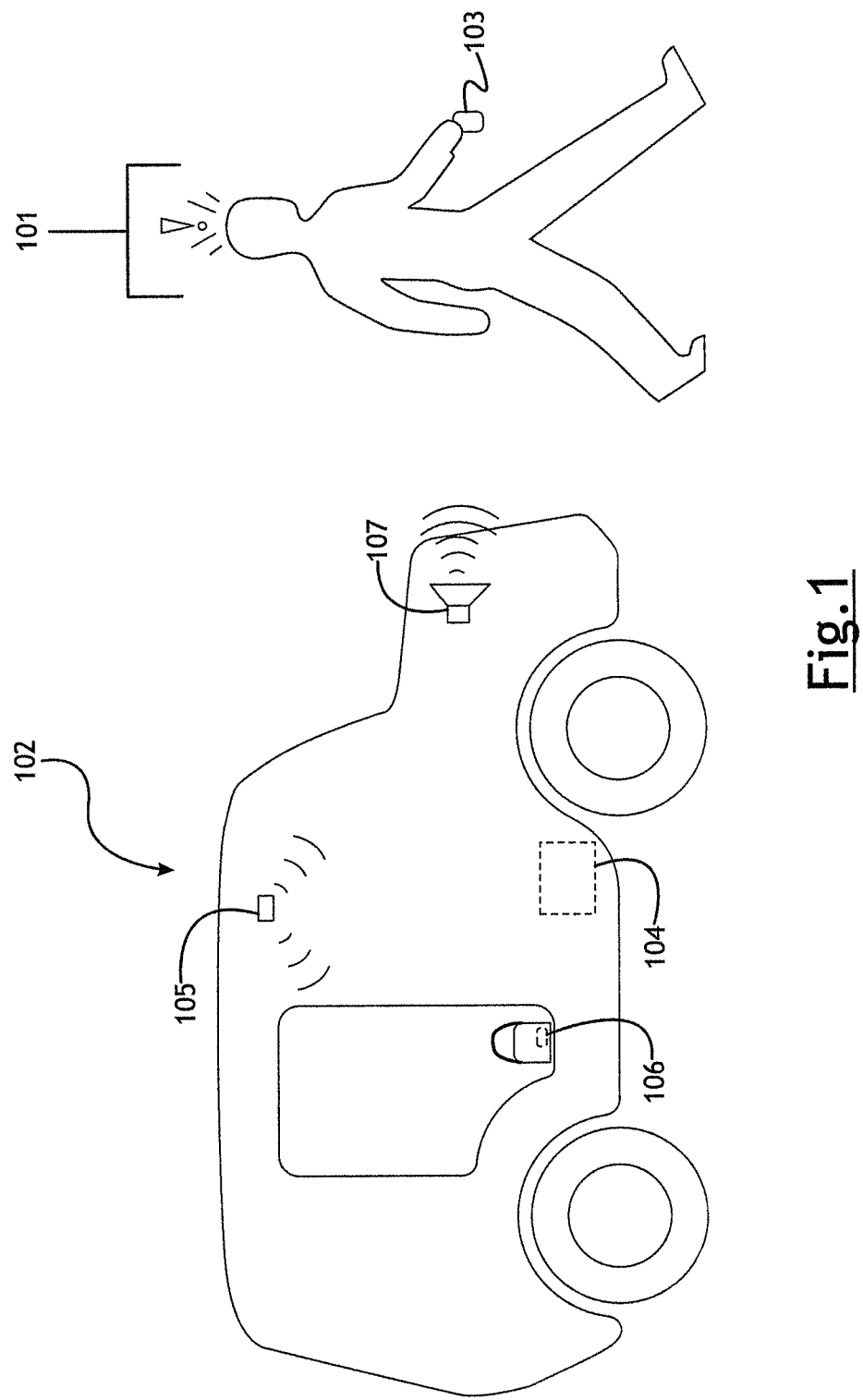
FIG. 1 illustrates a scenario which may cause an alert to be produced.

The following description of the variations is merely illustrative in nature and is in no way intended to limit the scope of the invention, its application, or uses.

In a number of illustrative variations, a vehicle may comprise a number of components including but not limited to doors, seatbelts, seats, headlights, an engine, an air conditioning system and all of its parts, wheels, a transmission, etc. The vehicle may also include any number of sensors which may sense and be polled and/or read by a controller. Additionally, the sensors may sense and produce signals based upon the at least one of the engagement, orientation, state, condition, or presence of any number of vehicle components or accessories. Additionally, at least one of the sensor signals or readings may be tracked and used by a controller in sequential logic as well as combinational logic.

In a number of illustrative variations, a vehicle may be paired with any number of active or passive communication devices such as a transmitter, receiver, or transceiver. In such variations, the communication devices may come in any number of forms or embedded in any number of portable devices such as key FOBs, personal effects, jewelry, clothing, etc. Additionally, the vehicle may use sensors to detect the presence or absence of the remote communication device, and may also produce an alert based upon the presence or absence of any number or combination of the communication devices. Additionally, such alerts may be produced by the detection of the presence or absence of the communication devices, over time, in any number of sequences of events.

In a number of illustrative variations, a controller, which is capable of processing sequential logic as well as combinational logic, may be housed onboard a vehicle. Additionally, a device capable of reading data from memory and/or external storage devices may be in electrical communication with vehicle components including but not limited to the controller. The controller may have onboard memory and may be in electrical communication with an external data storage device as well as external memory devices. The controller may be in electrical communication with any number of sensors, controllers, batteries, renewable energy sources or other electrical devices and may have the ability to store and timestamp data indicative of readings and/or signals from any number of sensors.

In a number of illustrative variations, a sensor may be used to detect that a first communication device is present; the sensor may be used to detect that a second communication device is not present; and, after the vehicle engine is started, a notification may be produced based upon sequential logic applied to at least one of readings or signals from the first and second sensors.

In a number of illustrative variations, a sensor may be used to detect that a first communication device is not present; the sensor may be used to detect that a second communication device is present; and, after the vehicle engine is started and the vehicle transmission is shifted into drive, a notification may be produced based upon sequential logic applied to at least one of sequential readings or sequential signals from the first and second sensors.

In a number of illustrative variations, a GPS device may be used to determine that the GPS device is at a preselected location where alerts are to be suppressed, and a controller in communication with the GPS device may ensure that an alert is suppressed, in accordance with a preselected degree of suppression, where an alert would normally be produced.

In a number of illustrative variations, detection of communication devices may be performed by any number of sensors.

In a number of illustrative variations, the communication devices may be capable of being detected remotely, such as but not limited to RFID tags, infrared emitters, SONAR beacons, radio beacons, etc.

In a number of illustrative variations, detection of a communication device which is associated with sensitive material or a living organism may trigger atmosphere control within the vehicle, such as controlling lighting of the cabin, or heating or cooling the cabin.

In a number of illustrative variations, a first sensor may be used to detect whether a first FOB with a communication device in it is present; a second sensor may be used to detect whether a second FOB with a communication device in it is not present; a third sensor may be used to detect that one of the rear doors has been open and shut; and an alert may be produced based upon at least one of combinational or sequential reading or signals from the first, second and third sensors.

In another illustrative variation, a sequential logic based notification system may be bound by a particular sequence. For example, a first sensor may be used to detect that a first communication device, which is associated with the driver of the vehicle, is present. Then, a third sensor may be used to detect that a rear door of the vehicle has been opened and shut. Subsequently, a second sensor may be used to detect that a second communication device, which is associated with a particular object or organism, is absent. Finally an alert may be raised based upon at least one of sequential readings or sequential signals from the first, second and third sensor.

In a number of illustrative variations, the sequence or combination of events leading to an alert may be set by the manufacturer or a user of the vehicle.

Referring to FIG. 1, driver 101 may exit the vehicle 102, carrying communication device 103, which is associated with driver 101, with him when he walks away from vehicle 102. On-board controller 104 may then poll sensor 105, or receive a signal from sensor 105, indicating that driver 101 has left communication device 106, which is associated with a particular object or organism, in the vehicle 102. Means of notification 107 (a speaker in this illustration) may then produce a notification or alert for driver 101, indicating that driver 101 has forgotten to take with him the important object or organism associated with communication device 106.

Figure 2:
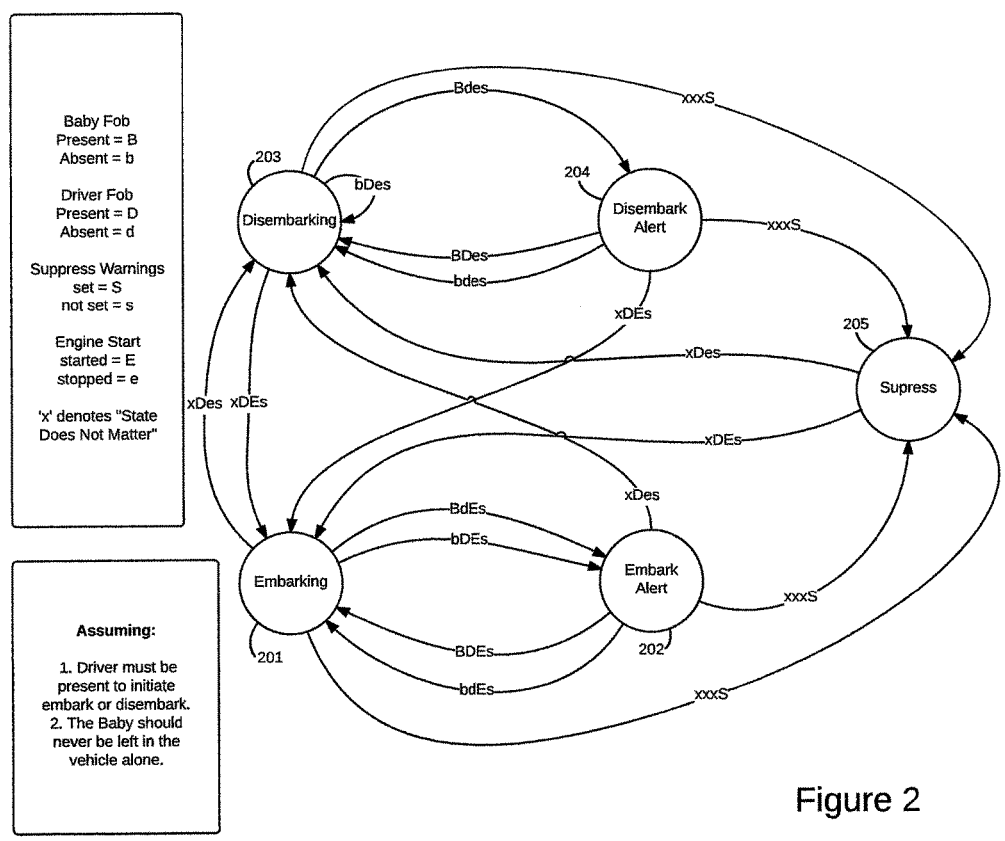
FIG. 2 illustrates a state machine which may be used by a controller to track events and produce an alert or notification according to a number of illustrative variations.

In a number of illustrative variations, there may be several stages or distinct states which may be reached by a sequence of combinational logic, each state having a name, as shown in the non-limiting illustration of FIG. 2. In FIG. 2, there are 5 states, each denoting noteworthy progress in a sequence. A sequence for a number of illustrative variations can be found in FIG. 2 by noting that there is no direct transition from state 204 ("Disembark Alert") to state 202 ("Embark Alert") or from state 203 ("Disembarking") to state 202 ("Embark Alert") or from state 201 ("Embarking") to state 202 ("Embark Alert"). That is, in FIG. 2, a sequence of events must occur in order to trigger the production of a particular reminder, alert, notification, etc.

Referring to FIG. 2, a legend for the state transitions is as follows:
Baby FOB Present='B'
Baby FOB Absent='b'
Driver FOB Present='D'
Driver FOB Absent='d'
Suppress Warnings='S'
Do Not Suppress Warnings='s'
Engine Started='E'
Engine stopped='e'
'x' denotes "State Does Not Matter".

Still referring to FIG. 2, it is assumed that the driver must take some action which begins any sequence of states beginning at state 201 ("Embarking") or at state 203 ("Disembarking"); It is also assumed that the driver must be present to initiate embark or disembark, and that the baby should never be left in the vehicle alone. It is additionally assumed, while referring to FIG. 2, that an alert of a particular type cannot be triggered unless an event or series of events achieves the logic state associated with that type of alert, first; For example: state 204 ("Disembark Alert") cannot be reached unless state 203 ("Disembarking") is reached first by a series or combination of events leading to that state. At state 201 ("Embarking") it is assumed that the driver has entered the vehicle and started the vehicle engine. From state 201 ("Embarking") state 202 ("Embark Alert") may be reached and an alert or notification may be triggered by either the driver bringing the baby FOB into or near the vehicle and exiting the vehicle without bringing the baby FOB along, or by the driver starting the car without the baby FOB near or in the vehicle. Once state 202 ("Embark Alert") is reached, it may be exited via some suppression event or action, which would either shift the logic to state 205 ("Suppress") or shift the logic back to state 201 ("Embarking"). To reach state 205 ("Suppress") some action must be taken with the sole effect of suppressing the notification or alert, such as by pressing a dedicated "Suppress" button or by speaking a code word, to be picked up by a sound sensing device in or on the vehicle, which would cause a controller to set the logic state to state 205 ("Suppress") or some equivalent thereof. In the illustrative variation shown in FIG. 2, state 203 ("Disembarking") may only be reached from state 205 ("Suppress") by turning off the vehicle engine, and undoing whatever predetermined action or actions which cause state 205 ("Suppress") to be entered. At state 203 ("Disembarking") it is assumed that the driver is in the vehicle the vehicle engine is stopped. From state 203 ("Disembarking") state 204 ("Disembark Alert") may be reached and an alert or notification may be triggered by the driver exiting the vehicle vicinity while leaving the baby FOB in or near the vehicle. Note that, in the illustrative variation shown in FIG. 2, a disembark alert will not be triggered if only the baby FOB leaves the vehicle while the control system is in state 203 ("Disembarking"). Once state 204 ("Disembark Alert") is reached, it may also be exited via some suppression event or action, which would shift the logic to state 205 ("Suppress").

Figure 3:
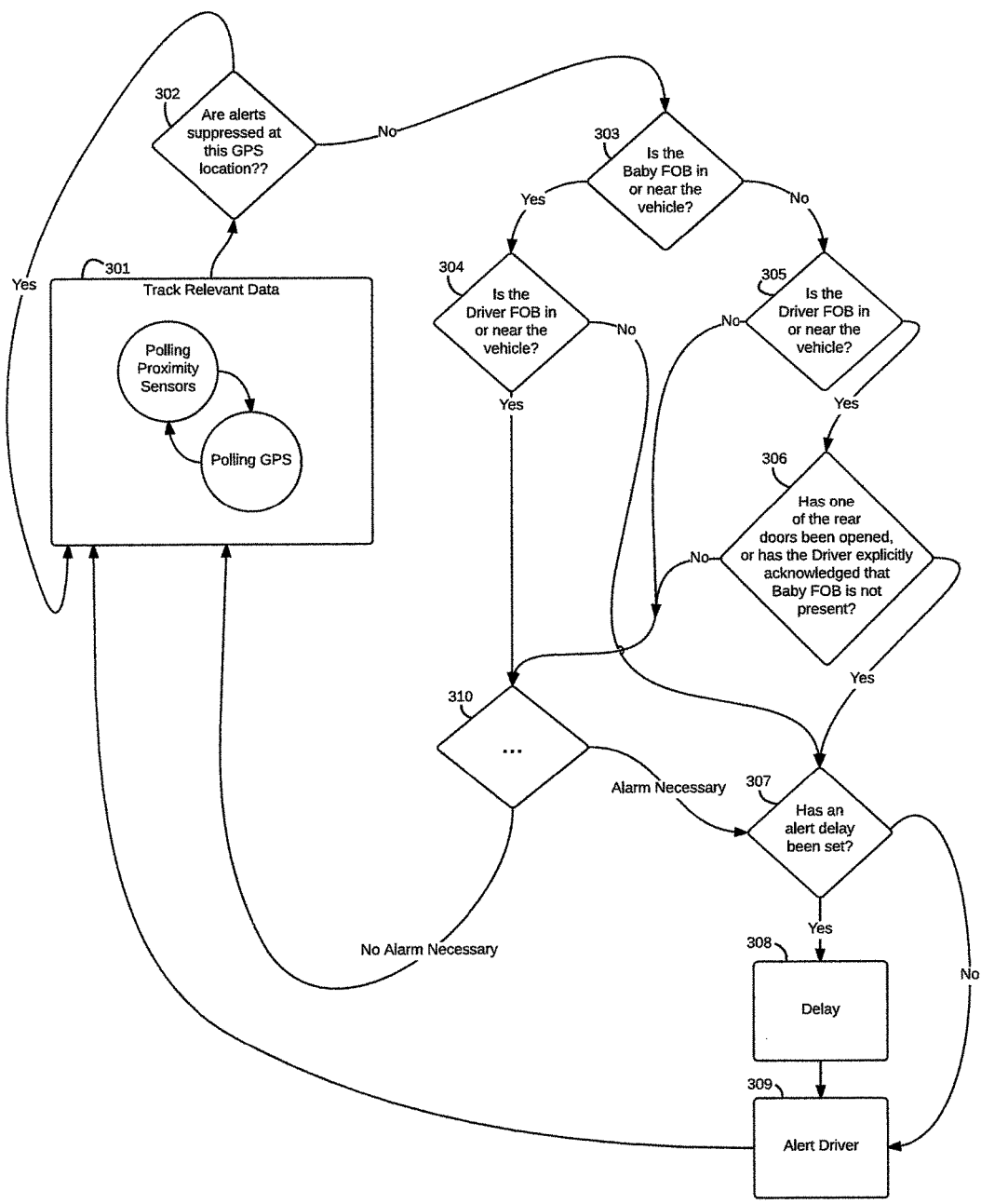
FIG. 3 illustrates a number of sequential logic scenarios which a controller may to track and handle by producing an alert or notification.

In a number of illustrative variations, notifications and alerts may be driven by any number of logical steps anchored upon the location, presence, and timing of presence of a number of communication devices in or near a vehicle, as shown in the non-limiting illustration of FIG. 3. Referring to FIG. 3, at step 301, the control system or controller may track data relevant for the generation or suppression of an alert. In the illustrative variation shown in FIG. 3, tracked data may include data such as proximity sensor data, GPS data, cabin atmosphere data, fuel consumption data, electrical power usage data, engine performance data, etc., and such data may be tracked by a controller ("Polling Proximity Sensors" and "Polling GPS" in this non-limiting illustration). Still referring to FIG. 3, after each polling cycle in step 301, the controller may determine at step 302 whether alerts are to be suppressed at the vehicle's current GPS location ("Are alerts suppressed at this GPS location?"); for example, a user may wish to stop the vehicle from producing specific types of alerts when the vehicle is parked at or near the GPS coordinates for their own home. At step 303, the controller may determine whether the Baby FOB is in or near the vehicle ("Is the Baby FOB in or near the vehicle?"). Following step 303, the controller may determine whether the Driver FOB is in or near the vehicle in steps 304 and 305 ("Is the Driver FOB in or near the vehicle?"). If the determination in step 303 was that the Baby FOB was in or near the vehicle, or was not in or near the vehicle, respectively. If, based upon the determination made in step 303, step 304 is reached, and it is determined in step 304 that the Driver FOB is in or near the vehicle, any number of other logical steps, which may lead to the production of a notification or alert, may follow, as denoted by the ellipsis in step 310 ("Alarm necessary" or "No Alarm Necessary"). If, however, the Driver FOB is not found to be in or near the vehicle at step 304, an alert or notification may be produced on account of the fact that the Driver FOB is separated from the Baby FOB (suggesting that the Baby or some other important organism or object has been left in the vehicle alone). In this case, according to the illustrative variation shown in FIG. 3, it must then be determined whether a delay has been set for the notification or alert, to be produced, in step 307 ("Has an alert delay been set?"). If no alert or notification delay has been set, then an alert or notification is produced for the driver of the vehicle in step 309 ("Alert Driver"). If an alert or notification delay has been set, the delay takes place in step 308 ("Delay") before the alert or notification is produced in step 309. If the determination at step 305 is that the Driver FOB is not in or near the vehicle, then any number of other logical steps, which may lead to the production of a notification or alert, may follow, as denoted by the ellipsis in step 310. If, however, the determination at step 305 is that the Driver FOB is in or near the vehicle, then it may be determined at step 306 whether one of the rear doors has been opened, or whether the driver has explicitly acknowledged that the Baby FOB is not in or near the vehicle ("Has one of the rear doors been opened, or has the Driver explicitly acknowledged that the Baby FOB is not present?"). In the illustrative variation shown in FIG. 3, if the determination is made in step 306 that the that one of the rear doors has not been opened, or that the driver has not acknowledge that the Baby FOB is not present, then any number of other logical steps, which may lead to the production of a notification or alert, may follow, as denoted by the ellipsis in step 310. If, however, the determination is made in step 306 that one of the rear doors has been opened, or that the driver has acknowledged that the Baby FOB is not present, then an alert or notification may be produced. In such a case, once again, it may be determined, at step 307, whether an alert or notification delay has been set, and proceed accordingly. This logic may keep looping continually, and data relevant to this logic may be collected during or before each iteration of the logic, even when the vehicle engine is stopped.

In a number of illustrative variations, sequential steps may be tracked by software using flags, interrupts, exception handling, signal handling or any other method known in the art or any combination of the aforementioned. For example, a controller may determine from memory or a signal that the vehicle engine is started. The controller may denote this combination by responding to at least one of a signal or reading from the first sensor by asserting a "EMBARK" flag variable in memory. A first sensor may then detect that a first communication device, associated with the driver, is in or near the vehicle. The controller may denote this combination by responding to at least one of a signal or reading from the first sensor by asserting a "DFOB" flag variable in memory. Subsequently, a third sensor may detect that, in the time that the first communication device has been in or near the vehicle, a back door of the vehicle was opened and shut and the controller may denote this by responding to at least one of a signal or reading from the third sensor by asserting a "RDOPENED" flag variable in memory. A second sensor may then a second communication device, associated with an object or organism (for example: a diaper bag) is not in or near the vehicle. The controller may denote this in memory by responding to at least one of a signal or reading from the second sensor by deserting a "BFOB" flag variable in memory. A memory reading device, which may perform a cyclic read on all flag variables in memory, may, in light of this combination of flag variable assertions, may then signal the controller to assert an "EMBARKALERT" flag variable in memory. The memory reading device, in the course of its cyclical read of flag variables, may then see that the "EMBARKALERT" flag variable is asserted, and send a signal to the controller which may handle the signal by producing a notification or alert to a user after any amount of delay time.

In a number of illustrative variations, a notification or alert may be suppressed or cancelled by some action which is intended solely to suppress the notification or alert, or by an action which breaks the sequence which caused the notification or alert.

In a number of illustrative variations, an alert may be produced by any number of sensory means including but not limited to an audio notification by a device such as a speaker; a visual notification by a device such as a display screen or an indicator light, including text messages or emails; or, a physical notification such as a physical pop-out indicator or a vibrating component which may come into contact with the user. Means for producing such an alert may be located on the interior of a vehicle as well as on the exterior of a vehicle.

In a number of illustrative variations, an alert may be produced by a first source, located outside of a vehicle cabin, and further conveyed to the user through a secondary source, within the cabin of the vehicle. For example, a beep may be produced by a speaker under the hood of the car and a reminder may also be displayed as a backlit icon within the interior of the car. Further, the secondary source may require some additional step to occur before it will produce an alert. For example, the backlit icon within the interior of the car may not light up until the transmission is taken out of park. This additional step may also be tracked as sequential logic by the controller.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: providing a vehicle; providing a number of sensors; providing a means of raising an alert; using at least one of the sensors to detect whether a first communication device is in or near the vehicle; using at least one of the sensors to detect whether a second communication device is in or near the vehicle; and, raising an alert based upon the result of controller logic regarding the sensor readings; wherein the logic accounts for whether the vehicle engine is running or not running.

Variation 2 may include the method of variation 1 wherein the controller logic is combinational.

Variation 3 may include the method of variation 1 wherein the controller logic is sequential.

Variation 4 may include the method of variation 1 wherein the alert is raised after a predetermined time delay.

Variation 5 may include the method of variation 1 wherein at least one of the sensors produce signals, and wherein the alert is raised based upon the sensor signals.

Variation 6 may include the method of variation 1 wherein the raising an alert comprises producing a sound.

Variation 7 may include the method of variation 1 wherein the raising an alert comprises notifying a user by visual means.

Variation 8 may include the method of variation 1 wherein the means of raising an alert occurs outside of the cabin of the vehicle.

Variation 9 may include the method of variation 3 wherein the sequential controller logic comprises using at least one of the sensors to determine that the first and second communication devices were detected in the following sequence: a) the first communication device was detected as in or near the vehicle; b) the second communication device was detected as in or near the vehicle.

Variation 10 may include the method of variation 1 further comprising using at least one of the sensors to detect whether a rear door has been opened and wherein raising an alert is based upon the result of a sequential controller logic regarding the sensor readings.

Variation 11 may include the method of variation 10 wherein the sequential controller logic comprises tracking the vehicle engine state and using at least one of the sensors to detect that the first and second communication device, and rear door manipulation were detected, and the vehicle engine was manipulated, in the sequence: a) the first device is near or in the vehicle; b) the rear door was opened and closed; c) the second communication device is not in or near the vehicle; d) the vehicle engine was started.

Variation 12 may include the method of variation 10 wherein the sequential controller logic comprises tracking the vehicle engine state and using at least one of the sensors to detect that the first and second communication device, and rear door manipulation were detected, and the vehicle engine was manipulated, in the sequence: a) the vehicle engine is running; b) the first communication device is in or near the vehicle; c) the second communication device is in or near the vehicle; d) the vehicle engine is not running.

Variation 13 may include the method of variation 2 wherein the combination controller logic comprises tracking the vehicle engine state and at least one of the sensors to indicate that the first and second communication devices, are present in the combination: a) the first communication device is present; b) the second communication device is not present; c) the vehicle engine is running.

The above description of select variations within the scope of the invention is merely illustrative in nature and, thus, variations or variants thereof are not to be regarded as a departure from the spirit and scope of the invention.

What is claimed is:

1. A method comprising:
   providing a vehicle;
   providing a number of sensors;
   providing a means of raising an alert;
   using at least one of the number of sensors to detect the presence or absence of a first communication device in or near the vehicle;
   using at least one of the number of sensors to detect the presence or absence of a second communication device in or near the vehicle; and,
   raising an alert based upon the result of controller logic regarding the sensor readings and based upon the presence or absence of the first and second communication devices, relative to each other;
   wherein the logic accounts for whether the vehicle engine is running or not running.

2. The method of claim 1 wherein the controller logic is combinational.

3. The method of claim 2 wherein the combination controller logic comprises tracking the vehicle engine state and at least one of the number of sensors to indicate that the first and second communication devices, are present in the combination:
   a) the first communication device is present;
   b) the second communication device is not present;
   c) the vehicle engine is running.

4. The method of claim 1 wherein the controller logic is sequential.

5. The method of claim 4 wherein the sequential controller logic comprises using at least one of the number of sensors to determine that the first and second communication devices were detected in the following sequence:
   a) the first communication device was detected as in or near the vehicle;
   b) the second communication device was detected as in or near the vehicle.

6. The method of claim 1 wherein the alert is raised after a predetermined time delay.

7. The method of claim 1 wherein at least one of the number of sensors produce signals, and wherein the alert is raised based upon the sensor signals.

8. The method of claim 1 wherein the raising an alert comprises producing a sound.

9. The method of claim 1 wherein the raising an alert comprises notifying a user by visual means.

10. The method of claim 1 wherein the means of raising an alert occurs outside of the cabin of the vehicle.

11. The method of claim 1 further comprising using at least one of the number of sensors to detect whether a rear vehicle door has been opened and wherein raising an alert is based upon the result of a sequential controller logic regarding the sensor readings.

12. The method of claim 11 wherein the sequential controller logic comprises tracking the vehicle engine state and using at least one of the number of sensors to detect that the first and second communication device, and rear vehicle door manipulation were detected, and the vehicle engine was manipulated, in the sequence:
   a) the first device is near or in the vehicle;
   b) the rear vehicle door was opened and closed;
   c) the second communication device is not in or near the vehicle;
   d) the vehicle engine was started.

13. The method of claim 11 wherein the sequential controller logic comprises tracking the vehicle engine state and using at least one of the number of sensors to detect that the first and second communication device, and rear vehicle door manipulation were detected, and the vehicle engine was manipulated, in the sequence:
   a) the vehicle engine is running;
   b) the first communication device is in or near the vehicle;
   c) the second communication device is in or near the vehicle;
   d) the vehicle engine is not running.

14. A method comprising:
   providing a vehicle;
   providing a number of sensors;
   providing a means of raising an alert wherein at least one of the number of sensors produce signals and the means of raising the alert is raised based upon the sensor signals;
   using at least one of the number of sensors to detect the presence or absence of a first communication device in or near the vehicle;
   using at least one of the number of sensors to detect the presence or absence of a second communication device in or near the vehicle;
   based upon the result of controller logic regarding the sensor readings, and based upon the presence or absence of the first and second communication devices, relative to each other, raising an alert comprising producing a sound and notifying a user by visual means via at least one of the vehicle, first communication device, or second communication device; and
   wherein the logic accounts for whether the vehicle engine is running or not running.

15. The method of claim 14 further comprising using at least one of the number of sensors to detect whether a rear vehicle door has been opened and wherein raising an alert is based upon the result of a sequential controller logic regarding the sensor readings.

16. The method of claim 15 wherein the sequential controller logic comprises tracking the vehicle engine state and using at least one of the number of sensors to detect that the first and second communication device, and rear vehicle door manipulation were detected, and the vehicle engine was manipulated, in the sequence:
 a) the first device is near or in the vehicle;
 b) the rear vehicle door was opened and closed;
 c) the second communication device is not in or near the vehicle;
 d) the vehicle engine was started.

17. The method of claim 15 wherein the sequential controller logic comprises tracking the vehicle engine state and using at least one of the number of sensors to detect that the first and second communication device, and rear vehicle door manipulation were detected, and the vehicle engine was manipulated, in the sequence:
 a) the vehicle engine is running;
 b) the first communication device is in or near the vehicle;
 c) the second communication device is in or near the vehicle;
 d) the vehicle engine is not running.

18. A method comprising:
 providing a vehicle including a number of sensors;
 providing a first key FOB, having wireless communication capabilities;
 providing a second key FOB, having wireless communication capabilities;
 providing a means of raising an alert;
 using at least one of the number of sensors to detect the presence or absence of the first key FOB in or near the vehicle;
 using at least one of the number of sensors to detect the presence or absence of the second key FOB in or near the vehicle; and,
 raising an alert based upon the result of controller logic regarding the sensor readings and based upon the presence or absence of the first and second key FOBs, relative to each other;
 wherein the logic accounts for whether the vehicle engine is running or not running.

* * * * *